United States Patent
Schober et al.

(10) Patent No.: US 9,363,044 B2
(45) Date of Patent: Jun. 7, 2016

(54) RADIO COMMUNICATIONS

(71) Applicant: Broadcom Corporation, Irvine, CA (US)

(72) Inventors: Karol Schober, Helsinki (FI); Timo Eric Roman, Espoo (FI); Helka-Liina Maattanen, Helsinki (FI); Mihai Horatiu Enescu, Espoo (FI)

(73) Assignee: BROADCOM CORPORATION, Irvine, CA (US)

( * ) Notice: Subject to any disclaimer, the term of this patent is extended or adjusted under 35 U.S.C. 154(b) by 307 days.

(21) Appl. No.: 13/873,912

(22) Filed: Apr. 30, 2013

(65) Prior Publication Data
US 2013/0308479 A1  Nov. 21, 2013

(30) Foreign Application Priority Data

May 16, 2012 (GB) .................... 1208642.7

(51) Int. Cl.
*H04L 1/20* (2006.01)
*H04L 1/00* (2006.01)
*H04B 7/02* (2006.01)

(52) U.S. Cl.
CPC ............ *H04L 1/20* (2013.01); *H04L 1/0034* (2013.01); *H04B 7/024* (2013.01)

(58) Field of Classification Search
None
See application file for complete search history.

(56) References Cited

U.S. PATENT DOCUMENTS

| | | | |
|---|---|---|---|
| 2012/0195285 A1* | 8/2012 | Ko et al. | 370/330 |
| 2012/0257568 A1* | 10/2012 | Cai et al. | 370/328 |
| 2013/0003788 A1* | 1/2013 | Marinier et al. | 375/219 |
| 2015/0036602 A1* | 2/2015 | Wang et al. | 370/329 |

FOREIGN PATENT DOCUMENTS

| | | |
|---|---|---|
| EP | 2 493 088 A2 | 8/2012 |
| WO | WO 2008/004835 A2 | 1/2008 |
| WO | WO 2011/014840 A1 | 2/2011 |

OTHER PUBLICATIONS

Renesas Mobile Europe Ltd., "CQI feedback options for CoMP," 3GPP TSG-RAN WG1 Meeting #68, R1-120376, Dresden, Germany, Feb. 6-10, 2012 (6 pages).
3GPP TR 36.819 v11.1.0, Technical Specification Group Radio Access network, "Coordinated multi-point operation for LTE physical layer aspects" (Release 11), Dec. 2011 (69 pages).
UKIPO Combined Search and Examination Report under Sections 17 and 18(3) dated Sep. 17, 2012 issued in a related UK Application No. GB1208642.7 (6 pages).

* cited by examiner

Primary Examiner — Awet Haile
(74) Attorney, Agent, or Firm — Foley & Lardner LLP

(57) ABSTRACT

An arrangement is described for adapting outer loop precoder phase combiner in a radio communication system having coordinated multipoint transmission. In the arrangement ACK/NACK-message received as a response to a transmitted data packet is used for adapting the phase. When a NACK-message is received the phase may be adapted or it may be further determined if the error was due to error in channel code or due to destructive inter-point signal combining. If the error was due to destructive combining the phase is adjusted.

15 Claims, 4 Drawing Sheets

RADIO COMMUNICATIONS

CROSS REFERENCE TO RELATED APPLICATION

This application claims the benefit under 3.5 USC 119(a) and 37 CFR 1.55 to UK Patent Application No. 1208642.7 filed on May 16, 2012, the entire contents of which is incorporated herein by reference.

TECHNICAL FIELD

The invention relates generally to radio communications.

BACKGROUND INFORMATION

The mobile communication networks are constantly under development by adding new features and improving already existing ones. The work is bound by the standardization between the manufactures of such networks for allowing the manufacturing of user equipment that works in mobile communication networks from different manufacturers. Thus, new features must be developed in accordance with already agreed features.

Coordinated multipoint (CoMP) transmission/reception is one of the features that are currently being specified to be a part of the Long Term Evolution (LTE) standard defined by 3rd Generation Partnership Project (3GPP). In multi-cell network technologies supporting frequency reuse, the network performance is interference limited, especially at the cell edge. An example of such technology is the LTE. The coordinated multipoint operation aims at strengthening the received signal and mitigating inter-cell interference. In the CoMP users may be served by a plurality of transmission points (TP) at the same time. The information transmitted from the plurality of transmission points can be the same or different. According, to the 3GPP technical report on CoMP, TR36.819, a point is a set of geographically co-located transmit antennas and the sectors of the same site may correspond to different points. It should be noted that a cell, may be formed by one or multiple points. In the field of CoMP the features relating to joint transmission, dynamic point selection and coordinated scheduling and beam forming are currently studied.

In joint transmission (JT) CoMP two or more points transmit simultaneously to a CoMP user. Both coherent and non-coherent JT-CoMP have been studied. Coherent JT-CoMP aims at coherent combining of received signal components from multiple transmission points. In order to achieve coherent combining gains, inter-point phase combiner user equipment feedback is required in addition to per transmission point channel state information (CSI) feedback. In non-coherent JT-CoMP, a user equipment (UE) receives signals from multiple transmission points. UE feeds back CSI on a per transmission point basis. Since non-coherent JT-CoMP does not aim at coherent combining gains, it does not require inter-point phase combiner feedback from the UE.

Dynamic point selection (DPS) refers to a scheme wherein the transmission point is switched according to changes in signal strength. In coordinated beamforming/scheduling (CB/CS) the scheduling decisions of neighbor points are coordinated in order to reduce interference. In principle, all schemes may include blanking/muting, which means that one or more transmission points are blanked/muted to decrease the interference.

It is desired to determine intra- and inter-cell DL CoMP schemes operating in homogeneous and heterogeneous configurations. Four main scenarios have been studied so far: intra-site (scenario 1), inter-site with high power remote radio heads (RRH) (scenario 2), low power RRH within the coverage of the macro cell, without and with the same cell ID (scenarios 3 and 4, respectively). The work addresses both frequency division duplex (FDD) and time division duplex (TDD). Hence unified solutions should be targeted, as it is typical, for example, in the LTE specifications. Hie network deployments thus include of a plurality of transmission points, and each transmission point has its own antenna configuration, such as e.g. in terms of the number of antennas and the type of antennas, for instance cross-polarized (XP) antennas or uniform linear arrays (ULA), with either close (e.g. $\lambda/2$) or large (e.g. $4\lambda$) separation between elements. Deployments with lower power nodes (LPN) or remote radio heads typically assume that the corresponding transmission points are geographically non-co-located.

It has been agreed that per point channel quality indicator (CQI) feedback is fed back per each transmission point in a CoMP measurement set of size N and additional feedback of aggregated joint $CQI_{JT}$ is currently under discussion.

A CQI depends on the transmission hypotheses made by the UE at a given time and the interference assumptions used for deriving per point CQIs. However, the CQIs reflect always the channel gains. Thus, per point CQIs reflect the individual link gains whereas the aggregated CQI reflects the sum of the channel gains and the way the signals add up at the receiver. For example, with the hypothesis of muted interfering points within the measurement set, the per cell channel quality indicator fed back for the n-th transmission point is defined as:

$$CQI_n = \frac{S_n}{\sigma^2 + I}$$

where $S_n$ denotes signal power received from point n, $\sigma^2$ denotes noise variance at the users and I denotes interference power received from out of the CoMP measurement set of transmission points. With the knowledge of these per point CQIs, as an implementation option, the network may derive a CQI estimate e.g. as a sum:

$$CQI_{est} = \sum_{n=1}^{N} CQI_n$$

This, however, does not include knowledge on the constructive/destructive addition of the signals from different transmission points. Therefore, the process of feeding back the additional aggregated $CQI_{JT}$ would result in improved system performance since the latter CQI precisely captures the constructive/destructive addition of received signal components the network is not aware of.

The single stream (i.e. rank-1) JT-CoMP transmission equation for N transmission points and single sub-carrier can be expressed as:

$$y = \sum_{n=1}^{N} c_n H^n w^n x + \eta$$

where x is a transmitted symbol; $H^n$ is a channel between n-th transmission point and receiver; $w^n$ is a tall preceding vector and $c_n$ is the combiner applied at the n-th transmission point; y is a received signal; $\eta$ is a noise term. Note that $c_1 = 1$ to avoid ambiguity and without any loss of generality.

As mentioned, the CQI is a function of the channel gains. As an example, an effective channel gain for a two point JT-CoMP single stream (i.e. rank-1) transmission reads:

$$G_{JT-CoMP} = |h_{eff}^1|^2 + |h_{eff}^2|^2 + 2Re(h_{eff}^{1H} c_2 h_{eff}^2)$$

wherein the first term is the channel gain from point 1, the second term is the channel gain from point 2 and the third term is constructive/destructive addition of channels from points 1 and 2.

In the equation $h_{\mathit{eff}}^n = H^n w^n$ is the channel after precoding from transmission point n and $c_2$ is the possible combiner weight between the two points. The last term describes the constructive/destructive addition of the channels from the two points. If the term is negative the addition is destructive and when the term is positive the addition is constructive. The constructiveness depends on the phase between the effective channel vectors and makes the addition positive/negative with 50% probability assuming no inter-point feedback information is used. Per-point CQIs capture only the individual channel gains, that is, in the above example with two points, the first two terms in Equation (1). Thus per-point CQIs do not capture the constructive/destructive addition and the last term of the channel gains in Equation (1) results in CQI mismatch.

The distribution of ratio CQIJT/CQIest is illustrated in FIG. 1. It can be seen that a negative combiner can result in the loss of as much as 10 dB, whereas positive combiner CQIC can bring at the most 3 dB gain. Therefore, it is beneficial to be in the "constructive combing area", where in addition to positive combining gain, the CQIest offset is on average as small as +−1.5 dB. The question is however, how to guarantee the transmission to be in "constructive combing area" with minimal UE feedback.

For both per-point CQIs and for joint CQI changes in the last term in equation (1) during CQI reporting interval causes CQI mismatch. There is typically an outer loop link adaptation (OLLA) algorithm that, follows through ACK/NACK reporting the signal condition changes resulting from channel gain variations, interference condition variations and in case of JT transmission also changes in the channel combining gain. If constructive/destructive channel additions vary in time and frequency from one extreme to another extreme it makes the task of OLLA more difficult and may result overall in poor system throughput performance. However, OLLA is a powerful tool to correct CQI error if the error direction does not fluctuate too much. Thus, if the addition of the signals can be made always, or most of the time, positive this would result in a positive effect for both aggregated CQI feedback assumption and for per-point CQI feedback assumptions. For aggregated CQI, the positive effect comes from signal-to-noise and interference ratio (SINR) and CQI level increase. For per-point CQIs, the receiver SINR is increased but not the per-point CQI reports themselves. However, as the CQI error direction is always positive, OLLA is able to compensate and the performance increase results from that.

The above mentioned OLLA algorithm is typically used for single point transmissions and is described in the following for the sake of the clarity. OLLA algorithm as such for single point transmissions is known to a person skilled in the art.

One type of OLLA algorithm targets at controlling the block error rate (BLER) target for the first transmission to the user equipment. More advanced OLLA algorithms aim at controlling the residual BLER target at the first re-transmission so the effect of the HARQ gain is captured by the algorithm. The OLLA algorithm adjusts an offset factor denoted by A according to the following rules:

In case a positive acknowledgment (ACK) is received for a first transmission, then decrease A by a quantity AstepDown in decibels.

In case a negative acknowledgement (NACK) is received for a first transmission, then increase A by a quantity AstepUp in decibels.

Only ACK/NACK's from first transmissions are used here for adjusting the offset A. The ratio between the parameters AstepUp and AstepDown determines the BLER target that, the algorithm will converge to:

$$BLER = \frac{1}{\frac{AstepUp}{AstepDown} + 1}$$

For certain desired BEER target (e.g. 10%) and a known AstepUp, one may compute AstepDown as:

$$AstepDown = \frac{AstepUP \cdot BLER}{1 - BLER}$$

The OLLA algorithm operates on top of the inner loop link (i.e. CQI) adaptation for a given UE by subtracting the offset value A from the reported CQI:

CQIapplied=CQIreported−A [dB]

It is further ensured that the OLLA offset factor A remains within a given predetermined range [dBmaxOuterLoopLAOffset, dBmmOuterLoopLAOffset] (e.g. [−1 dB, 3 dB]) to avoid possible divergence of the algorithm. Since the OLLA algorithm is recursive, parameters need to be initialized, e.g. AstepUp=0.5 dB. Optimum tuning of OLLA parameters can be made through system level simulations.

A drawback of the prior art is that without combiner phase indicator feedback information constructive combination cannot be guaranteed and OLLA algorithm may converge within the destructive combining area resulting in considerably lower system performance.

SUMMARY

Embodiments of the invention generally relate to adapting outer loop precoder phase combiner in a radio communication system having coordinated multipoint transmission. For example, a ACK/NACK-message received as a response to a transmitted data packet can be used for adapting the inter-point combiner phase. When a NACK-message is received the inter-point combiner phase may be adapted or it may be further determined if the error was due to error in channel code or due to destructive inter-point signal combining. If the error was due to destructive combining, the inter-point combiner phase is adjusted.

According to a first, aspect, the present invention provides a method for inter-point combiner adaptation in a radio communication network having coordinated multipoint transmission, the method including: transmitting a data packet to a user equipment: receiving an acknowledgment message from the user equipment; and processing of an inter-point combiner phase over a respective scheduled band if the data packet was received with errors.

According to a second aspect, the present invention provides a network element operable in a radio communication network having coordinated multipoint transmission, the element including: a network interface for transmitting a data packet to a user equipment, wherein the network element is configured to: transmit a data packet to a user equipment; receive an acknowledgment message from the user equipment; and process an inter-point combiner phase over a respective scheduled band if the data packet was received with errors.

According to a third aspect, the present invention provides system including: a mobile communication network having coordinated multipoint transmission; a network element including a network interface for transmitting a data packet to a user equipment; and a user equipment, wherein the network element is configured to: transmit a data packet to the user equipment; receive an acknowledgment message from the user equipment; and process an inter-point combiner phase over the scheduled band if the data packet was received with errors.

Other aspects and embodiments of the present invention will become apparent from the following description, drawings and claims.

A benefit, of certain embodiments of the invention is that it facilitates maintaining system operation in the constructive area and, as a result, closer to the coherent combining state. As will become apparent, certain embodiments do not require further modifications and can be applied easily. A further benefit of operating in the constructive area is that the offset for OLLA is minimized which leads into further improvements in system performance.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Reference will now be made in detail to the embodiments of the present invention, examples of which are illustrated in the accompanying drawings.

Figure 1:
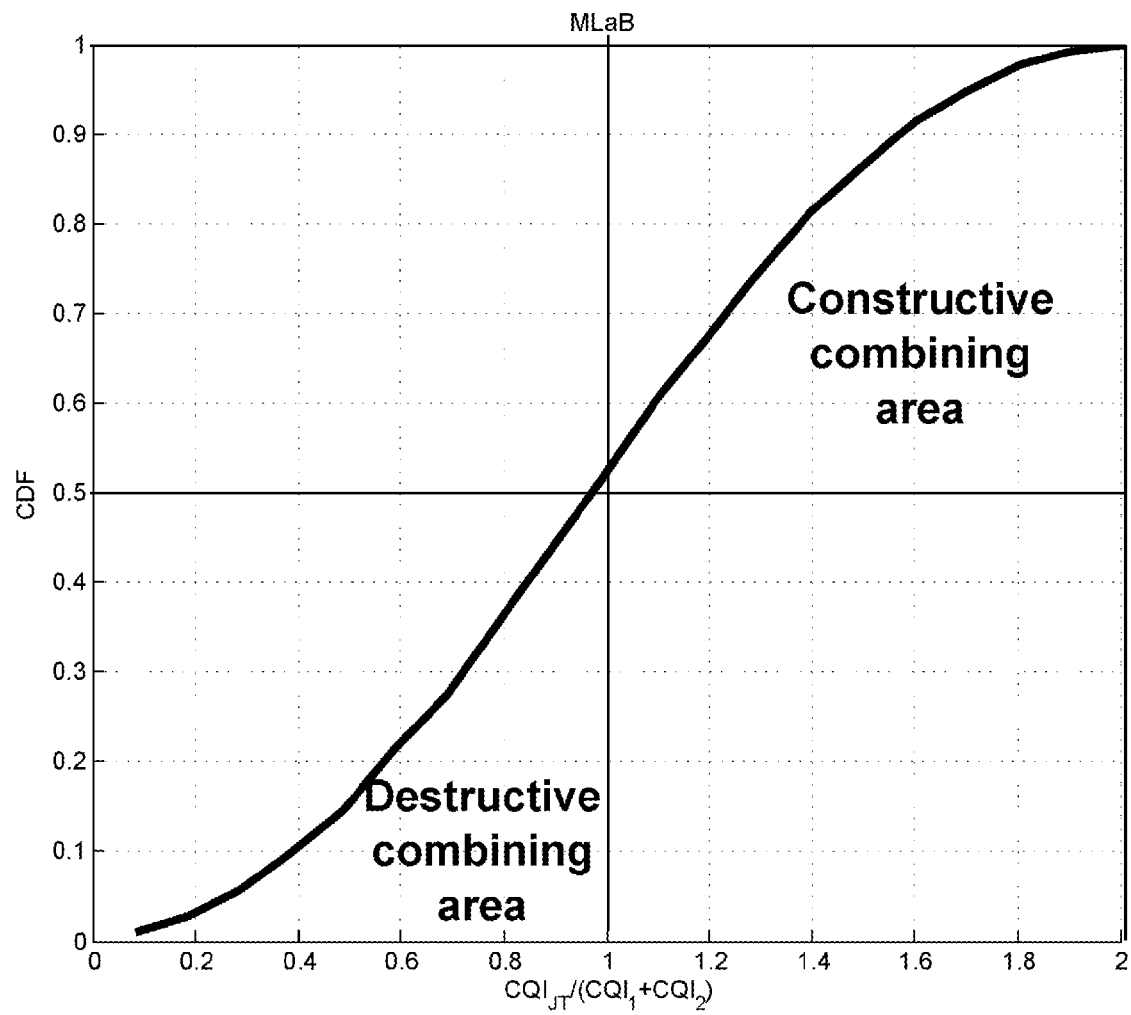
FIG. 1 is an exemplary graph illustrating prior art properties of constructive and destructive areas.
Figure 2:
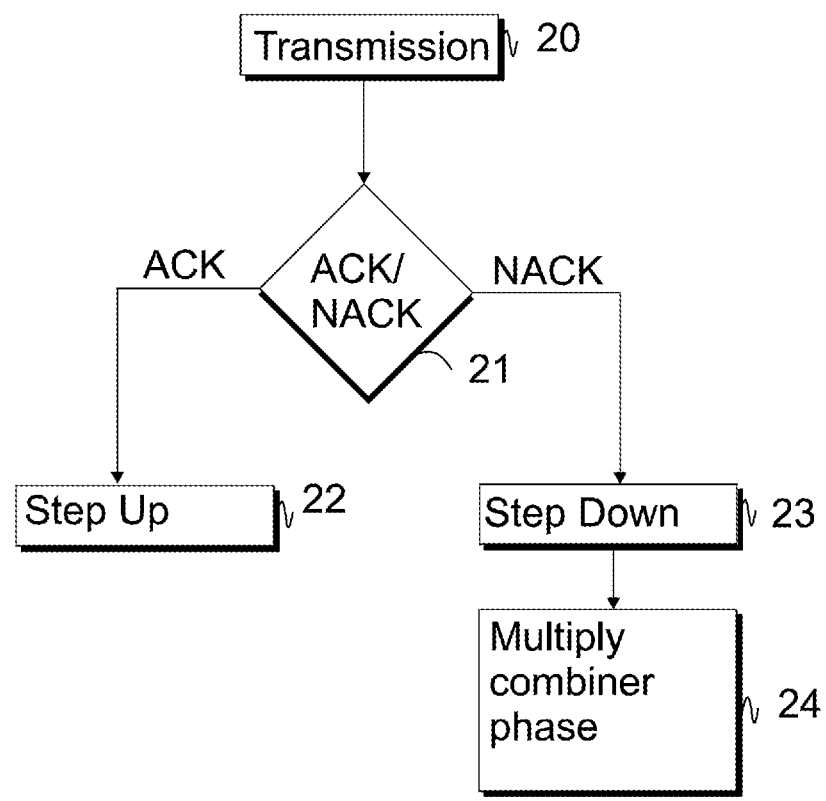
FIG. 2 is a flowchart illustrating a transmission according to an embodiment of the present invention.

FIG. 2 illustrates a method according to the present invention. The method illustrated in FIG. 2 is a simple implementation of the present invention, wherein the invention is implemented together with an outer loop link adaptation algorithm, which is assumed to be the typical case even if the invention works also alone. In the method, first a data packet is transmitted from a transmission point to the user equipment, in step 20. The LIE sends an ACK or NACK as a response to the transmission point. The transmission point receives the response and acts accordingly, in step 21. If the UE received the data packet without errors an ACK message is received. The transmission point then issues an outer loop link adaptation offset step up, in step 22.

If the UE received the packet with errors a NACK message is sent as a response. When the transmission point receives a NACK it first issues an outer loop link adaptation step down, in step 23, and multiplies the scheduled band inter-point combiner phase at the transmission point by −1, in step 24.

By using the above described arrangement it is possible to keep the transmission in the "constructive inter-point combining area" as described in the background of the invention without additional feedback related to the inter-point phase.

In other words, inter-point phase weighting is applied at the IT participating evolved node Bs (eNodeB), and phase weighting depends on UE ACK/NACK feedback, where a NACK indicates that a packet error is caused by either noise and interference or destructive inter-point signal combining (effective joint CQI being in fact lower than the one inferred at eNodeB side). Under good signal-to-noise and interference (SINR) conditions, the latter type of error is expected to be more likely. In that case, flipping inter-point phase combining weights for the next transmission will likely lead to constructive channel addition, provided that channel coefficients do not vary much over time. The above described Inter-point combiner phase adaptation generalizes to transmission of rank higher than one or in other words to multi-stream transmission. In this case, inter-point combiner phase adaptation could apply per transmitted data stream or in general to any data payload having associated ACK/NACK feedback. Since data streams are generally mapped to transport blocks or codewords, and each of these has typically its own ACK/NACK feedback, processing of inter point combiner phase can apply to either one of per transport, block, per codeword or transmission layer. One can also have inter-point combiner phase adaptation on a per transmission mode basis. Proposed inter-point, combiner phase adaptation can thus be applied to any OLLA process, hence also to multi-rank OLLA processes where processing of inter-point combiner phase can be applied to either one of per layer, per codeword or per transport block or per transmission mode.

The above described outer-loop phase adaptation (OLPA) combined with OLLA algorithm can deliver significant, gain in link level simulator. The following table discloses simulated JT-CoMP transmission of rank-1, with OLPA and without OLPA, with extended link level simulator with Round Robin scheduler scheduling S=1,2 over sub-bands of 6 PRBs.

|  |  | OLPA | No OLPA |
| --- | --- | --- | --- |
| S = 1 sub-bands scheduled | Average spectral efficiency [b/Hz/s] | 1.832 [15.5%] | 1.586 [0%] |
|  | Codeword error rate | 3.0% | 10.5% |
| S = 2 sub-bands scheduled | Average spectral efficiency [b/Hz/s] | 1.807 [13.75%] | 1.589 [0%] |
|  | Codeword error rate | 3.5% | 10.2% |

The UE feedback mode over PUSCH is 3-2, i.e. sub-band preceding matrix index (PMI) and sub-band CQI. The results show that OLPA can bring gains with zero extra feedback, since UE anyway already feeds back ACK/NACKs.

Figure 3:
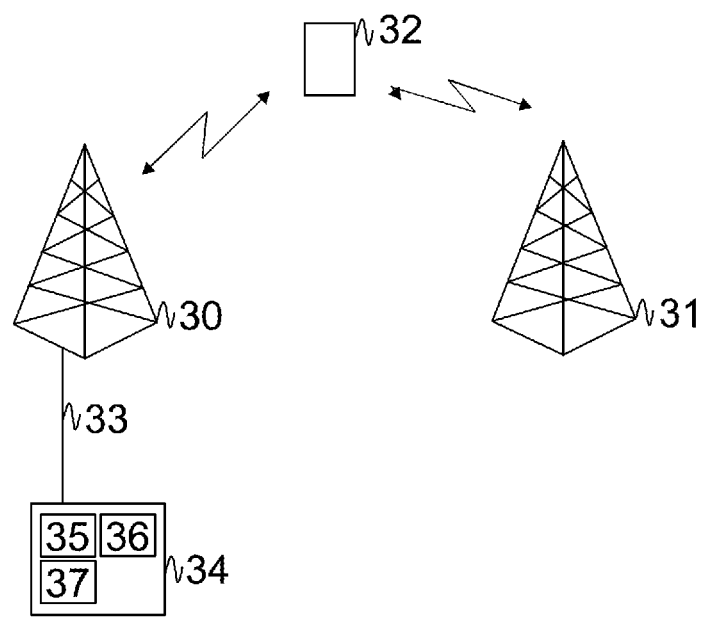
FIG. 3 is a schematic block diagram illustrating a system according to an embodiment, of the present invention.

FIG. 3 illustrates a system according to an embodiment of the present invention. The system illustrated in FIG. 3 includes a UE 32 that is served by two different transmission points 30 and 31. Transmission points may be, for example, two different cells or eNodeB's. The network element 34 is coupled to the cell 30 by a connection 33. The connection 33 is typically a fixed line but may instead be a radio communication link. The cell 31 is connected to a corresponding network element by corresponding coupling, however, for the sake of the clarity these are not drawn to the figure. The network element acts as a transmission point and it includes a network interface 35 for communicating with other network components, a processor 36 for executing computer programs and a memory 37 for storing computer programs and data required by such computer programs. The memory may be volatile and/or non-volatile it may also be used for other purposes than storing data. The network element is configured to perform a method in accordance with the present invention, such as a method illustrated in FIG. 2.

The network element 34 is configured to make a transmission of a data packet to the UE 32. The UE 32 responds to the communication by sending an ACK if the data packet was received correctly or a NACK if the data packet was received with errors. If the data packet was received with errors the network element is configured to process the scheduled band inter-point combiner phase. The processing may be done as explained above in the embodiment of FIG. 2 or as it will be explained in the embodiment of FIG. 4.

Figure 4:
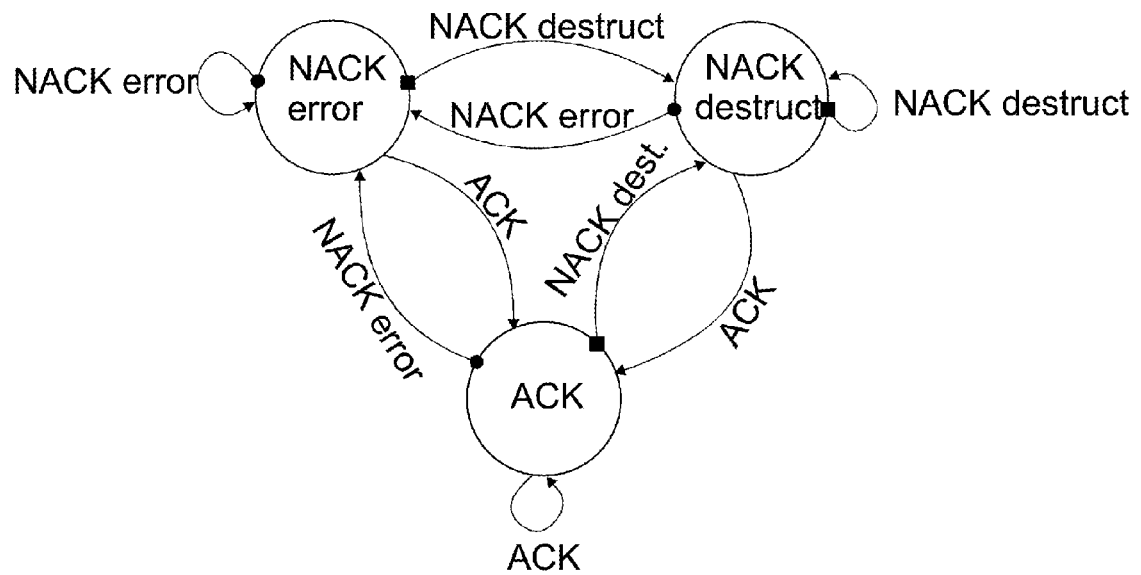
FIG. 4 is an illustration of a finite state machine according to an embodiment of the present invention.

FIG. 4 discloses a finite state machine in accordance with an embodiment of the present invention, wherein the invention is implemented together with outer loop link adaptation algorithm. The diagram of FIG. 4 describes the state machine followed by a scheduler. This approach aims to estimate whether NACK occurred due to destructive inter-point signal combining (NACK destruct) or due to an error in the channel code (NACK error). In order to make such decision at the scheduler, two probabilities $p_{error}$ and $P_{destruct}$ are maintained and updated in memory. The corresponding decisions follow the filled dots or squares in the diagram. A square means that $p_{destruct} > p_{error}$ and a dot means that $p_{destruct} < p_{error}$. If $p_{destruct} = p_{error}$ the phase is changed as well as Astepdown is issued.

Note that a BPSK inter-point phase combiner change was mostly considered, but QPSK, 8PSK or other phase combiners could be used as well. The initialization of the probabilities can be for example $p_{destruct}=0.5$, and $p_{error}=BLER_{target}=0.1$. An example of algorithm implemented at the scheduler is as follows:

| Received input/ Performed output | OLPA (BPSK) phase change | OLLA step up | OLLA step down | $p_{error}$ | $p_{destruct}$ |
| --- | --- | --- | --- | --- | --- |
| ACK | | x | | Increased by BLER target (max 1) | Increase with dependency on coherence time |
| NACK error | | | x | Decreased to BLER target | Increase with dependency on coherence time |
| NACK destruct | x | | | | decrease |

The above mentioned method may be implemented as computer software which is executed in a network element, such as the network element disclosed above. When the software is executed in a computing device it is configured to perform the above described inventive method in order to facilitate discovery resources in a mobile communication network. The software is embodied on a computer readable medium so that it can be provided to the computing device.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for inter-point combiner adaptation in a radio communication network having coordinated multipoint transmission, the method comprising:
    transmitting a data packet to a user equipment;
    receiving an acknowledgment message from the user equipment; and
    processing an inter-point combiner phase over a respective scheduled band if the data packet was received with one or more errors, said processing comprising:
        determining a reason for at least one of the one or more errors using the acknowledgment message from the user equipment;
        multiplying the scheduled band inter-point combiner phase by −1 in response to determining the at least one error occurred due to destructive inter-point signal combining; and
        refraining from modifying the scheduled band inter-point combiner phase and proceeding to a next transmission if the error occurred due to an error in a channel code.

2. The method according to claim 1, wherein the radio communication network is using outer loop link adaptation mechanism and, as a response to the receipt of an acknowledgment message from the user equipment, the method further comprises:
    issuing an outer loop precoder link adaptation offset step up if the data packet was received without errors; and
    issuing an outer loop precoder link adaptation offset step down and processing the scheduled band inter-point combiner phase if the data packet was received with one or more errors.

3. The method according to claim 1, wherein processing of the inter-point combiner phase applies to either one of per layer, per codeword or per transport block or per transmission mode.

4. The method according to claim 1, wherein said determining is based on two probability values, wherein the first value corresponds with an error due to destructive inter-point signal combining and the second corresponds with an error due to channel code and the reason is due to an error in channel code when the first value is smaller than the second value and the reason is due to destructive inter-point signal combining when the first value is larger than the second value.

5. The method according to claim 4, wherein the method further comprises maintaining said two values, wherein:
    the first and second values are increased, if the data packet was received without errors;

the first value is decreased and the second value is increased, if the data packet was received with one or more errors due to error in channel code; and the second value is decreased if the data packet was received with one or more errors due to destructive inter-point signal combining.

6. An apparatus comprising:
circuitry configured to:
transmit a data packet to a user equipment;
receive an acknowledgment message from the user equipment; and
process an inter-point combiner phase over a respective scheduled band if the data packet was received with one or more errors, the circuitry configured to:
determine a reason for at least one of the one or more errors using the acknowledgment message from the user equipment;
multiply the scheduled band inter-point combiner phase by −1 in response to determining the at least one error occurred due to destructive inter-point signal combining; and
refrain from modifying the scheduled band inter-point combiner phase and proceed to the next transmission if the error occurred due to an error in a channel code.

7. The apparatus according to claim 6, wherein the apparatus is as a response to the received acknowledgment message from the user equipment further configured to:
issue an outer loop link adaptation offset step up if the data packet was received without errors; and
issue an outer loop link adaptation offset step down and process the scheduled band combiner phase if the data packet was received with one or more errors.

8. The apparatus according to claim 6, wherein the apparatus is configured to apply the inter-point combiner phase to either one of per layer, per codeword or per transport block or per transmission mode.

9. The apparatus according to claim 6, wherein said apparatus is configured to perform said determination based on maintaining two probabilities, wherein the first value corresponds with destructive combining and the second corresponds with an error due to channel code and the reason is due to an error in channel code when the first value is smaller than the second value and the reason is due to destructive inter-point signal combining when the first value is larger than the second value.

10. The apparatus according to claim 9, wherein the apparatus is configured to maintain said two values, wherein the apparatus is configured to:
increase the first and second values, if the data packet was received without errors;
decrease the first value and increase the second value, if the data packet was received with one or more errors due to an error in channel code; and
decrease the second value if the data packet was received with one or more errors due to destructive inter-point signal combining.

11. A computer program product comprising at least one non-transitory computer-readable storage medium having computer readable instructions stored thereon, the computer-readable instructions being executable by a computerized device to cause the computerized device to at least:
transmit a data packet to a user equipment;
receive an acknowledgment message from the user equipment; and
process an inter-point combiner phase over a scheduled band if the data packet was received with one or more errors, said processing comprising:
determining a reason for at least one of the one or more errors using the acknowledgment message from the user equipment;
multiplying the scheduled band inter-point combiner phase by −1 in response to determining the at least one error occurred due to destructive inter-point signal combining; and
refraining from modifying the scheduled band inter-point combiner phase and proceeding to a next transmission if the error occurred due to an error in a channel code.

12. The computer program product according to claim 11, wherein the computerized device is as a response to the received an acknowledgment message from the user equipment further configured to:
issue an outer loop link adaptation offset step up if the data packet was received without errors; and
issue an outer loop link adaptation offset step down and process the scheduled band combiner phase if the data packet was received with one or more errors.

13. The computer program product according to claim 11, wherein the computerized device is further configured to at least one of:
apply the inter-point combiner phase to either one of per layer, per codeword or per transport block or per transmission mode, and
during said processing to multiply the scheduled band combiner phase by −1.

14. The computer program product according to claim 11, wherein said the computerized device is further configured to perform said determination based on maintaining two probabilities, a first value corresponds with destructive combining and a second value corresponds with an error due to channel code and the reason is due to an error in channel code when the first value is smaller than the second value and the reason is due to destructive inter-point signal combining when the first value is larger than the second value.

15. The computer program product according to claim 14, wherein the computerized device is further configured to maintain said two values, wherein the computerized device is configured to:
increase the first and second values, if the data packet was received without errors;
decrease the first value and increase the second value, if the data packet was received with one or more errors due to an error in channel code; and
decrease the second value if the data packet was received with one or more errors due to destructive inter-point signal combining.

* * * * *